(12) United States Patent
Honda (10) Patent No.: US 7,269,439 B2
(45) Date of Patent: Sep. 11, 2007

(54) SLIDE-TYPE MULTI-DIRECTIONAL INPUT KEY

(75) Inventor: Masahito Honda, Tamakawa-mura (JP)

(73) Assignee: Polymatech Co., Ltd., Tokyo (JP)

(*) Notice: Subject to any disclaimer, the term of this patent is extended or adjusted under 35 U.S.C. 154(b) by 395 days.

(21) Appl. No.: 10/602,875

(22) Filed: Jun. 25, 2003

(65) Prior Publication Data

US 2004/0002356 A1   Jan. 1, 2004

(30) Foreign Application Priority Data

Jun. 26, 2002   (JP) .............................. 2002-186983

(51) Int. Cl.
*H04M 1/00* (2006.01)
(52) U.S. Cl. .................. 455/550.1; 436/37; 345/169
(58) Field of Classification Search ............. 455/550.1, 455/575.4; 345/169, 184, 156; 463/36, 463/38
See application file for complete search history.

(56) References Cited

U.S. PATENT DOCUMENTS

| | | | |
|---|---|---|---|
| 4,536,625 A * | 8/1985 | Bebie ...................... | 200/5 A |
| 5,012,230 A * | 4/1991 | Yasuda ..................... | 345/160 |
| 5,446,480 A * | 8/1995 | Yoshida .................... | 345/157 |
| 5,504,502 A * | 4/1996 | Arita et al. ................ | 345/160 |
| 6,094,191 A * | 7/2000 | Watanabe et al. .......... | 345/168 |
| 6,839,050 B2 * | 1/2005 | Sakamaki et al. .......... | 345/156 |
| 6,871,060 B1 * | 3/2005 | Strohmeier ................ | 455/345 |
| 2001/0033270 A1 | 10/2001 | Osawa et al. | |
| 2002/0061735 A1 * | 5/2002 | Wingett et al. ............. | 455/90 |
| 2002/0064018 A1 * | 5/2002 | Suzuki ...................... | 361/288 |
| 2003/0038780 A1 * | 2/2003 | Lu ............................ | 345/161 |
| 2003/0083021 A1 * | 5/2003 | Hsu et al. .................. | 455/90 |

FOREIGN PATENT DOCUMENTS

| | | |
|---|---|---|
| DK | 10000598 A1 | 7/2001 |
| EP | 1037230 A2 | 9/2000 |
| JP | 55-121425 A | 8/1980 |

(Continued)

OTHER PUBLICATIONS

Europpean Search Report.
Office Action from the Japanese Patent Office, dated Apr. 13, 2007.

*Primary Examiner*—Matthew D. Anderson
*Assistant Examiner*—Christian A. Hannon
(74) *Attorney, Agent, or Firm*—Rader, Fishman & Grauer PLLC (57) ABSTRACT

A multi-directional input key is capable of plural inputs through multi-directional operation, wherein the plural inputs are realized by a novel multi-directional operation, instead of the conventional operation in which force is applied to the operation surface so as to push it in deeply. There is provided a central key top equipped with an upper key top protruding from an insertion hole of an outer-ring key top and a lower key top having a pushing member protruding downwardly therefrom. This central key top is supported on a key sheet so as to be slidable in the direction of the hole inner surface of the insertion hole. And, when the central key top is caused to slide, an upper contact and a lower contact of a membrane switch are brought into contact with each other to effect input under the pressure from the pushing member.

10 Claims, 6 Drawing Sheets

FOREIGN PATENT DOCUMENTS

| | | |
|---|---|---|
| JP | 2-210728 A | 8/1990 |
| JP | 5-90765 U | 12/1993 |
| JP | 7-1546 U | 1/1995 |
| JP | 7-085751 A | 3/1995 |
| JP | 3037357 U | 2/1997 |
| JP | 9-190724 A | 7/1997 |
| JP | 10-340152 A | 12/1998 |
| JP | 11-025808 A | 1/1999 |
| JP | 2000322980 | 11/2000 |
| JP | 2001-135196 A | 5/2001 |
| JP | 2001-185004 A | 7/2001 |
| JP | 2002-023920 A | 1/2002 |
| JP | 2002-093278 A | 3/2002 |
| WO | WO-01/13392 A1 | 2/2001 |
| WO | WO-01/52291 A1 | 7/2001 |

* cited by examiner

SLIDE-TYPE MULTI-DIRECTIONAL INPUT KEY

BACKGROUND OF THE INVENTION

1. Field of the Invention

The present invention relates to an input key to be provided in the input operation device of an electric apparatus, such as a portable information terminal apparatus like a mobile telephone and PDA etc, car audio equipment, and a remote control unit for performing remote control operation. In particular, the invention relates to a multi-directional input key capable of plural inputs through multi-directional operation with a single input key.

2. Description of the Related Art

To meet a recent demand for an increase in the number of functions with which an electric apparatus is endowed, the input operation device of an electric apparatus as mentioned above is often equipped with a multi-directional input key capable of plural inputs through multi-directional operation with a single input key. As in the case of a mobile telephone, in a known multi-directional input key, an annular operation surface of an annular input key is depressed at one of four positions: top, bottom, right-hand, and left-hand positions, to thereby perform plural input operations. Then, in accordance with the respective inputs, scrolling of a display screen, selection of various items, movement of a cursor, etc is executed. In particular, in the mobile telephone, an incorporation of game applications is in vogue. To play with such game applications, plural inputs are usually effected by using an input key having the annular operation surface.

However, such a multi-directional input key as mentioned above involves a depressing operation in which force is applied from above so as to deeply push down the annular operation surface at one of the four positions: the top, bottom, right-hand, and left-hand positions. This operation often makes the operator feel fatigued at a relatively early stage. Thus, in addition to its rather small size, the input key has a problem in that its operability is not as satisfactory as it ought to be, which means the multi-directional input key leaves much to be desired before it can be used as the input operation device of an electric apparatus in which frequent use of the multi-directional input key is to be expected, e.g., a portable information terminal apparatus which allows utilization of electronic mail, game application or the like, as in the case of a mobile telephone or PDA.

The present invention has been made in view of the above problem in the prior art. It is an object of the present invention to provide a multi-directional input key for use as an input operation device for an electric apparatus in which it is possible to effect plural inputs through a novel multi-directional operation method instead of the conventional input operation method in which force is applied so as to deeply push the key.

SUMMARY OF THE INVENTION

To achieve the above object, there is provided, in accordance with the present invention, a slide-type multi-directional input key including: a key top which has an upper portion protruding from an insertion hole extending through an exterior member and a lower portion having a pushing member protruding downwardly therefrom and which is capable of sliding in the direction of a hole inner surface of the insertion hole, and a plurality of contact input portions adapted to effect input upon receiving pressure from the pushing member when the key top is caused to slide.

In the present invention, there is provided a key top having an upper portion protruding from an insertion hole extending through an exterior member and a lower portion having a pushing member protruding downwardly therefrom and capable of sliding in the direction of the hole inner surface of the insertion hole. In addition, there are provided a plurality of contact input portions adapted to effect input upon receiving pressure from the pushing member when the key top is caused to slide. Thus, instead of the input operation for the conventional multi-directional input keys involving deep pushing-in with force, an input operation is performed in which input can be effected through individual contact input portions by sliding the key top, which requires no great force. If conducted repeatedly, this input operation involves very little fatigue on the part of the operator. Further, it helps to achieve an improvement in terms of operability. Further, since the input operation is performed through the key-top sliding, which requires no great force, this multi-directional input key is suitable for the multi-directional input key of an electric apparatus of which space saving is much required as in the case of a portable information terminal apparatus etc. Further, the present invention adopts an input operation involving no pushing-in, so that when applied to the multi-directional input key of a portable information terminal apparatus, on which input operation is often performed with one hand, the present invention makes it possible to perform the input operation in a stable manner.

In this way, in the slide-type multi-directional input key of the present invention, the input is effected through the contact input portions with pressure from the pushing member generated by sliding the key top. It is to be noted, however, that it is practically impossible to slide the key top exclusively in the horizontal direction without involving any slight pushing-in. When the operator actually slides the key top with a finger, he or she inevitably feels with the finger the requisite operational resistance for the sliding. Thus, in the slide-type multi-directional input key of the present invention, the input may be effected through the contact input portion while pushing in the key top to some degree insofar as is necessary for obtaining the requisite operational resistance for sliding the key top. It is to be noted, therefore, that this pushing-in operation in the present invention needed for sliding the key top is to be distinguished from the pushing-in operation in the prior art, in which the multi-directional input key is deeply pushed in with force so as to effect input.

This sliding of the key top can be stopped by bringing the key top, which protrudes from the insertion hole of the exterior member, into contact with the hole inner surface (the inner peripheral surface of the hole extending in the hole-axis direction) of the insertion hole. However, bringing the outer side surface of the key top into contact with the hole inner surface of the insertion hole can flaw the contacted portion of the key top, thereby impairing the outward appearance of the key top. This is typically the case where the surface of the key top is coated, for example. To solve this problem, in the slide-type multi-directional input key of the present invention, the exterior member may have on its back surface a stopper protrusion for stopping the sliding of the key top before it has come into contact with the insertion hole.

The key top makes input sliding from its initial position toward the hole inner surface of the insertion hole and return sliding back to the initial position. As a means for supporting the key top so as to allow the input sliding and return sliding, there is further provided, in accordance with the present invention, a key sheet formed of a rubber-like resilient material and adapted to support the key top so as to allow it to slide from the initial position in the direction of the hole inner surface of the insertion hole and in the return direction toward the initial position. Then, this key sheet is firmly attached to the key top and the exterior member. Thus, by utilizing the resiliency of the key sheet, it is possible to reliably effect both input sliding and return sliding of the key top. Further, any dust, dirt or water is prevented from entering through the gap between the key top and the exterior member by means of the key sheet firmly attached to the key top and the exterior member.

As a specific example of the manner of firm attachment of the key sheet to the key top, the present invention adopts a construction in which the key top is composed of upper and lower key top portions, between which the key sheet is sandwiched for firm attachment. In this construction, in which the key sheet is secured between the upper and lower key top portions, it is possible to attach the two members firmly to each other so that no detachment may occur even if sliding is repeatedly performed. Further, this helps to achieve a further improvement in terms of sealing property.

The key sheet slidably supporting the key top may include an inclined portion spreading out from the portion firmly attached to the key top, and an arch-shaped curved portion formed by upwardly bending the inclined portion starting with its lower end portion, in which the wall thickness of an erect wall portion in the outer periphery of the curved portion is larger than the wall thickness of an erect wall portion on the inner periphery thereof and that of the inclined portion. In this construction, when the key top is caused to slide, the portion connecting the thin-walled inner peripheral erect wall portion and the inclined portion on the sliding-direction side (the lower end portion of the inclined portion) is rotated using the thick-walled outer peripheral erect wall portion in the curved portion as a fulcrum so as to bring that portion under the thick-walled erect wall portion, thus effecting orderly elastic deformation. Thus, at the time of sliding, the key sheet, which undergoes elastic deformation, constitutes no obstacle. Further, when the key top makes return sliding, the thick-walled outer peripheral erect wall portion exerts an elastic urging force for returning on both the sliding-direction side and the side opposite thereto, whereby it is possible to restore the key top reliably to the initial position.

The above-mentioned plurality of contact input portions, through which input is effected by sliding the key top, may be formed by a membrane switch composed of a base film with a plurality of lower contact portions, a flexible film with a plurality of upper contact portions corresponding to the lower contact portions, and a spacer film forming a predetermined gap between the base film and the flexible film.

Further, in the present invention, there is further provided a central contact portion below the pushing member of the key top at its initial position, whereby it is possible to extend a range of operational choices to cope with a further increase in the number of functions of the electric apparatus equipped with this slide-type multi-directional input key. In this case, it is desirable that when the key top is at a slide position, the bottom surface of the pushing member be situated above the central contact portion so that the pushing member can effect input through both the contact input portions and the central contact portion, thereby further extending the range of operational choices. Note that in this specification, the term "slide position" means any position to which the key top is caused to slide from an initial position, i.e., a position where no operation is performed on the key top. It may be a position where the key top has completely stopped sliding or a halfway position in the course of sliding.

Furthermore, in the slide-type multi-directional input key of the present invention, it is also possible to further provide a conventional-type (pushing-in type) input key, thereby further extending the range of operational choices. In this case, as the exterior member having a key top insertion hole extending therethrough, there is provided a ring-shaped outer-ring key top allowing multi-directional input. On the other hand, the exterior member may also be formed by a structure member, such as a casing or bracket, of the electronic apparatus equipped with the slide-type multi-directional input key of the present invention. That is, in this specification, the term "exterior member" means a member having an insertion hole through which the upper portion of the key top (upper key top portion) is passed for the protrusion.

The above description of the present invention should not be construed restrictively. The objects, advantages, features, and uses of this invention will become more apparent from the following description given with reference to the accompanying drawings. Further, it is to be understood that all modifications made without departing from the gist of this invention are covered by the scope of this invention.

DESCRIPTION OF THE PREFERRED EMBODIMENTS

An embodiment of the present invention will now be described with reference to the drawings. While in the following embodiment the slide-type multi-directional input key of the present invention is described as example which is applied to the input operation device of a mobile telephone, it goes without saying that it is also applicable to the input operation devices of other electric apparatus, such as other portable information terminal apparatuses like PDA, or car audio equipment, or various remote control units.

Figure 1:
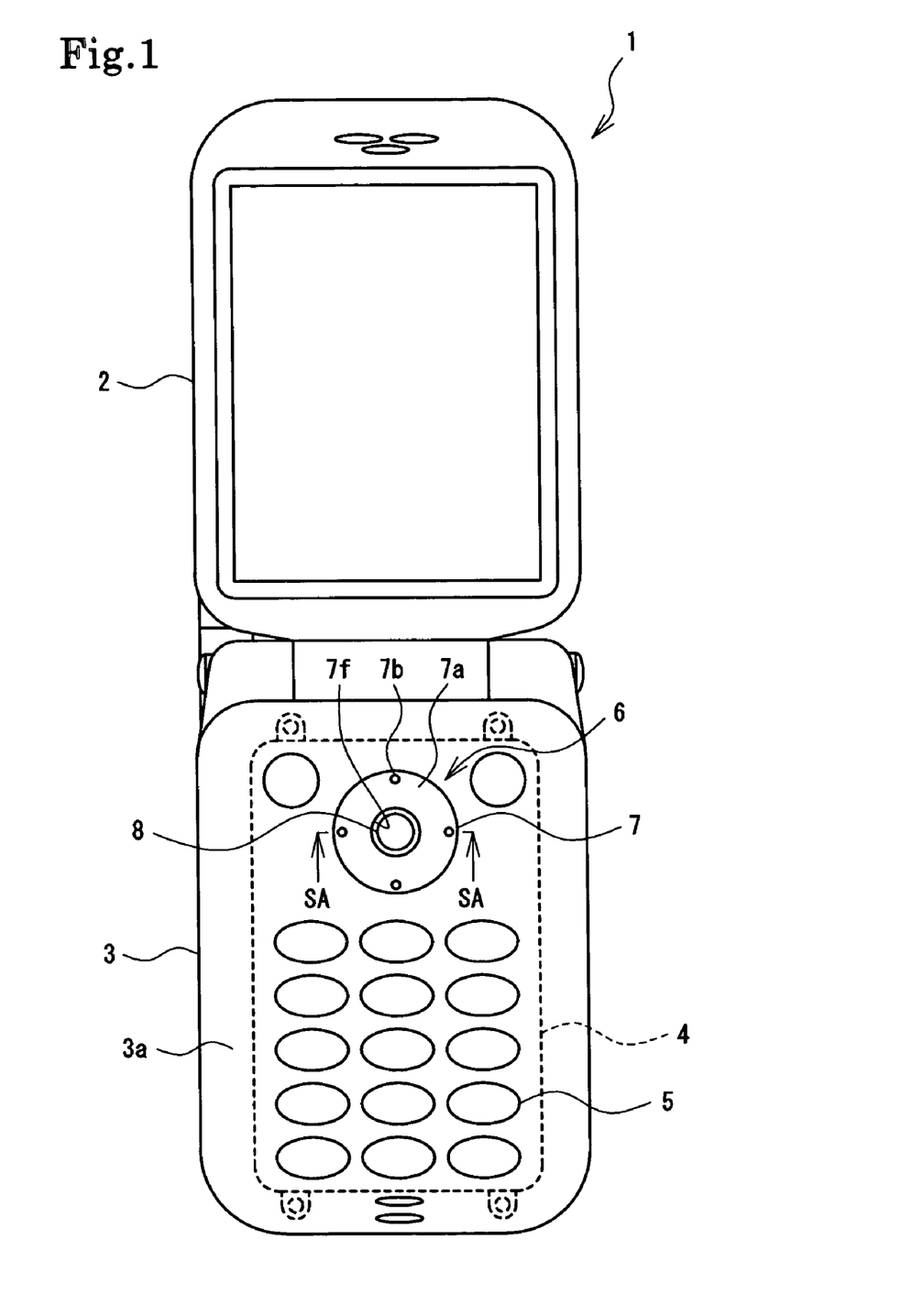
FIG. 1 is a plan view of a mobile telephone equipped with a slide-type multi-directional input key according to an embodiment of the present invention.

FIG. 1 shows a collapsible mobile telephone 1, which is equipped with an output portion 2 having a speaker and a display screen and an input portion 3 having a microphone and an input operation device. The casing 3a of the input portion 3 contains a key pad 4 serving as the input operation device. The key pad 4 is equipped with a plurality of pushbuttons 5 having thereon characters, figures, symbols, patterns, etc. (not shown), and a slide-type multi-directional input key 6 according to this embodiment.

Figure 2:
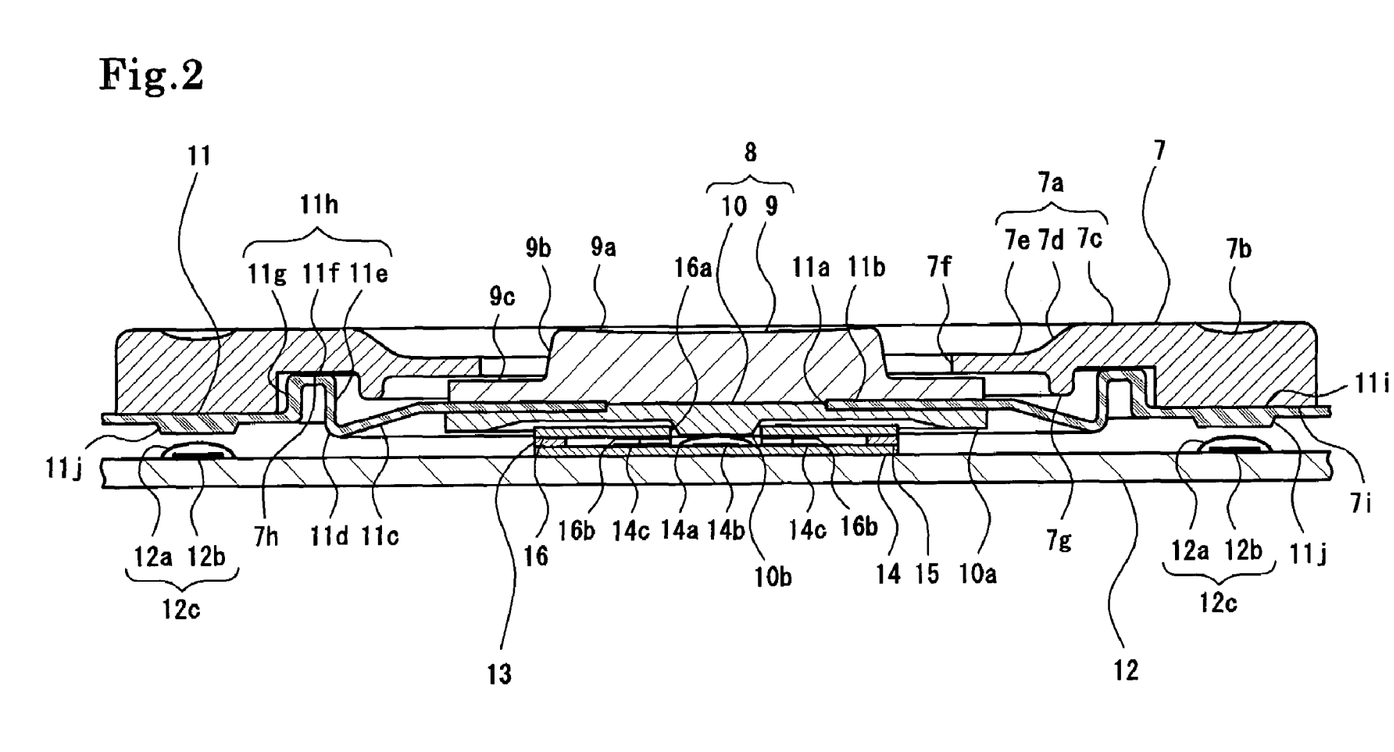
FIG. 2 is a sectional view of the slide-type multi-directional input key taken along the line SA-SA of FIG. 1.

The slide-type multi-directional input key 6 is equipped with an outer-ring key top 7 appearing on the mobile telephone 1 as the "exterior member" and a central key top 8 serving as the "key top" proper. The outer-ring key top 7 is formed of a hard resin, and is to be used to effect plural inputs through multi-directional operation in which an annular operation surface 7a is pushed in from above. The annular operation surface 7a has semi-spherical dents 7b indicating to an operator, through both vision and sense of touch, the top, bottom, right-hand, and left-hand positions in FIG. 1 for pushing-in operation. Further, as shown in FIG. 2, the annular operation surface 7a of the outer-ring key top 7 is composed of an outer peripheral portion 7c which is the highest and which has the above-mentioned dents 7b, an inner peripheral portion 7e which is the lowest, and a curved inclined portion 7d connecting the outer peripheral portion 7c and the inner peripheral portion 7e, with an insertion hole 7f circular in plan view (FIG. 1) being formed at the innermost end of the inner peripheral portion 7e. On the side (back side) right opposite to the curved inclined portion 7d, there is formed a downwardly protruding stopper protrusion 7g in an annular shape as seen from the back side of the outer-ring key top 7. On the outer side of the stopper protrusion 7g, there is formed a reversed groove 7h, in an annular shape as seen from the back side of the outer-ring key top 7, minimizing the wall thickness of the corresponding portion of the outer peripheral portion 7c.

The central key top 8, which is adapted to effect plural inputs through multi-direction operation by sliding, is composed of an upper key top 9 and a lower key top 10, which are formed as separated components. The upper key top 9 is formed of a hard resin, which is solid and hat-shaped in section. Its top surface is formed as an operating surface 9a in the form of a gently curved recessed surface, making it possible to perform multi-directional operation through sliding in a satisfactory manner. Formed on the outer edge of this operating surface 9a is an outer peripheral surface 9b inclined so as to widen out. At the lower end portion of the outer peripheral surface 9b, there is formed an outwardly directed flange 9c. The lower key top 10, which is substantially of a disc-like configuration, is formed of a hard resin. On the bottom surface 10a of this lower key top 10, there is formed a downwardly protruding trapezoidal pushing member 10b, which is circular as seen from the bottom surface 10a side.

The outer-ring key top 7 and the central key top 8 constructed as described above, are firmly attached to a key sheet 11. That is, the bottom surface 7i of the outer peripheral portion 7c of the outer-ring key top 7 is firmly attached to the key sheet 11. Further, a circular through-hole 11a formed in the key sheet 11 and the entire peripheral portion 11b thereof are sandwiched between the upper key top 9 and the lower key top 10, and in this condition, the central key top 8 is firmly attached to the key sheet 11. Thus, even if foreign matter like dust, dirt or water enters through the gap between the central key top 8 and the outer-ring key top 7, such foreign matter is prevented from entering the interior of the mobile telephone 1 to cause malfunction due to the sealing effect obtained by the key sheet 11 firmly attached to the outer-ring key top 7 and the central key top 8. The joining together of the above components and the joining of the upper key top 9 and the lower key top 10 are effected by a chemical means, such as an adhesive, welding, or heat sealing. If there is no particular need to take the sealing property obtained by the key sheet 11 into consideration, it is possible to partially fix the bottom surface 7i of the outer peripheral portion 7c of the outer-ring key top 7 to the key sheet 11, or fix it by a mechanical means, such as clips or screws. By being thus firmly attached to the key sheet 11, the central key top 8 is slidably supported.

The key sheet 11 is formed of a rubber-like resilient material, such as silicone rubber and thermoplastic elastomer. As shown in FIG. 1, the other pushbuttons 5 are also firmly attached to the key sheet 11, and FIG. 2 only shows the portion corresponding to the slide-type multi-directional input key 6 partially. In addition to the through-hole 11a and the hole-edge peripheral portion 11b, the key sheet 11 has an inclined portion 11c inclined so as to spread out from the outermost end of the hole-edge peripheral portion 11b. Then, on the outer side of the lower end portion of the inclined portion 11c, there is formed, through the intermediation of a bent portion 11d, a curved portion 11h which is reverse-U-shaped (arch-shaped) in section and annular in plan view and which is composed of an inner peripheral erect wall portion 11e, a top wall portion 11f, and an outer peripheral erect wall portion 11g. The outer peripheral erect wall portion 11g of this curved portion 11h has a wall thickness larger than that of any of the inclined portion 11c, the inner peripheral erect wall portion 11e, and the top wall portion 11f. Further, the curved portion 11h thus constructed is accommodated in the space of the reverse groove 7h of the outer peripheral portion 7c of the outer-ring key top 7. In addition, on the outer side of the lower end portion of the outer peripheral erect wall portion 11g, there is formed the base portion 11i of the key sheet 11 to which the outer-ring key top 7 is firmly attached as stated above. Four downwardly protruding trapezoidal pushing members 11j (only two of which are shown in FIG. 2) are formed on the bottom surface.

A printed circuit board 12 is provided below the key sheet 11. The printed circuit board 12 has contact input portions 12c each of which consists of a metal belleville spring 12a and a contact 12b provided on a circuit wiring formed on the printed circuit board 12 at positions below the pushing members 11j of the key sheet 11.

Further, a membrane switch 13 is provided below the central key top 8. The membrane switch 13 has a laminate structure composed of a base film 14, a spacer film 15, and a flexible film 16, all of which are formed of soft resin.

Figure 3:
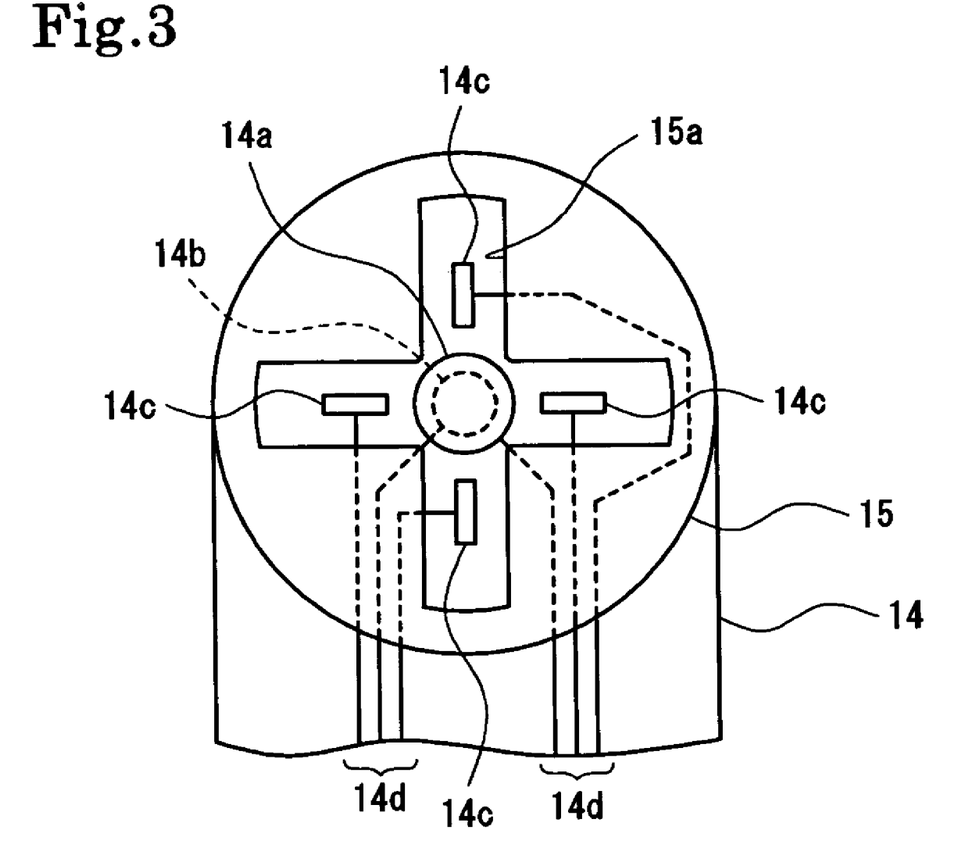
FIG. 3 is a plan view showing a wiring form of a membrane switch of the slide-type multi-directional input key shown in FIG. 2.

As shown in a partial enlarged view of FIG. 3, the base film 14 is equipped with a metal belleville spring 14a arranged at the center, a contact 14b provided on the circuit wiring, four lower contacts 14c provided at radial positions with respect to the metal belleville spring 14a, and wiring 14d for these components.

The flexible film 16 has an exposure hole 16a, circular in plan view and opening the upper portion of the metal belleville spring 14a (See FIG. 2), with the lower end portion of the pushing member 10b of the lower key top 10 being situated in the hole (within the thickness of the flexible film 16). Further, in the periphery of the exposure hole 16a, there are formed upper contacts 16b (see FIG. 2) respectively corresponding to the four lower contacts 14c and wiring (not shown) for the upper contacts 16b.

Further, the spacer film 15 has a cross-shaped film removal hole 15a as shown in FIG. 3. This film removal hole 15a is provided for the purpose of enabling the lower contacts 14c and the upper contacts 16b to come into contact with each other and of making the flexible film 16, which is under the pressure of the pushing member 10b of the lower key top 10 when the central key top 8 slides, easy to deflect.

In addition, an ON/OFF signal generated by bringing into conduction the metal belleville spring 14a and the contact 14b, constituting the "central contact portion" of the membrane switch 13, and an ON/OFF signal generated by bringing into conduction the lower contacts 14c and the upper contacts 16b, constituting the "contact input portions", are detected by a CPU of the mobile telephone 1 provided on the printed circuit board 12 through the wiring 14d, and input/non-input by the central key top 8 is effected.

Next, the operation of the slide-type multi-directional input key 6 of this embodiment will be described.

Figure 4:
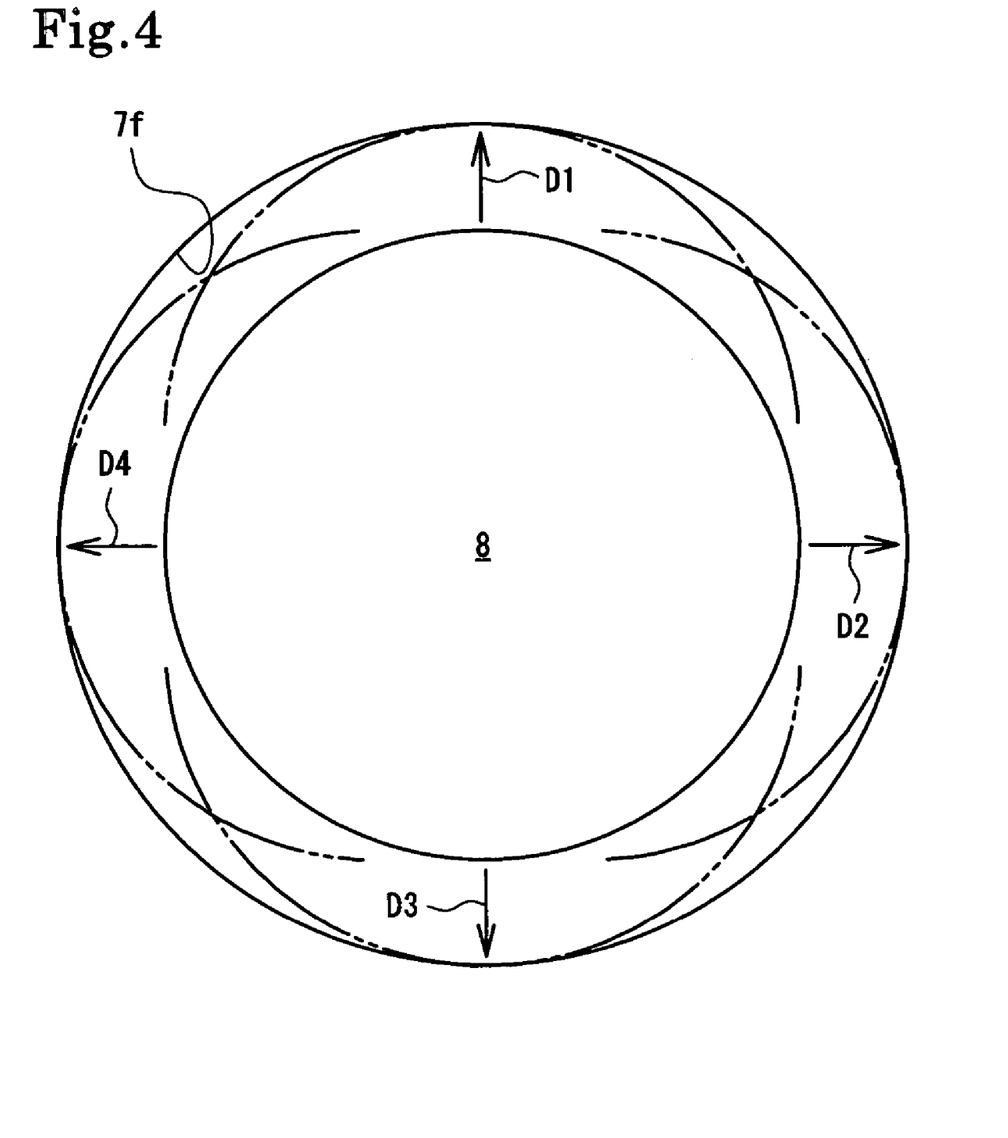
FIG. 4 is a schematic explanatory view showing how a central key top slides.

(Input sliding of the central key top 8): As shown in FIG. 4, plural inputs by multi-directional operation of the central key top 8 are effected by causing the central key top 8 to make input sliding in the upwards (D1), downwards (D3), to the right (D2), and to the left (D4). While the case in which input sliding is effected to the left (D4) will be described here, the operations of input sliding and return sliding in the other directions are the same as the one described below. When the central key top 8 is caused to slide to the left (D4), the pushing member 10b of the lower key top 10 first comes into contact with the hole inner surface (the inner peripheral surface of the hole extending in the hole axis direction) of the exposure hole 16a of the flexible film 16 of the membrane switch 13. Since the pushing member 10b is formed of a hard resin providing good slidability, and its outer peripheral surface is formed as an inclined surface, it is not caught in the exposure hole 16a. Thus, the central key top 8 continues to slide smoothly despite this contact.

Then, in the input sliding process subsequent to this contact, the flexible film 16 is deflected while being pressurized so as to be brought closer to the base film 14, with the pushing member 10b sliding on a flexible film 16 with good slidability. At this time, no spacer film 15 exists under the flexible film 16. That is, the film removal hole 15a is situated there. Thus, the flexible film 16 is easily deflected and deformed under the pressure from the pushing member 10b. With this deflective deformation of the flexible film 16, the upper contact 16b is also displaced downwards, until it comes into contact with the corresponding lower contact 14c of the base film 14. Then, as shown in FIG. 5, when the outwardly directed flange 9c of the upper key top 9 abuts the stopper protrusion 7g of the outer-ring key top 7, the input sliding of the central key top 8 stops, and the upper contact 16b is completely brought into perfect contact with the lower contact 14c.

In the condition in which the outwardly directed flange 9c of the upper key top 9 abuts the stopper flange 7g, the outer peripheral surface 9b of the upper key top 9 remains out of contact with the insertion hole 7f of the outer-ring key top 7. Thus, there is no danger of the outer peripheral surface 9b of the upper key top 9, which is visible on the mobile telephone 1, and the insertion hole 7f of the outer-ring key top 7f being flawed, or the coating thereon being peeled off to impair the outward appearance.

Figure 5:
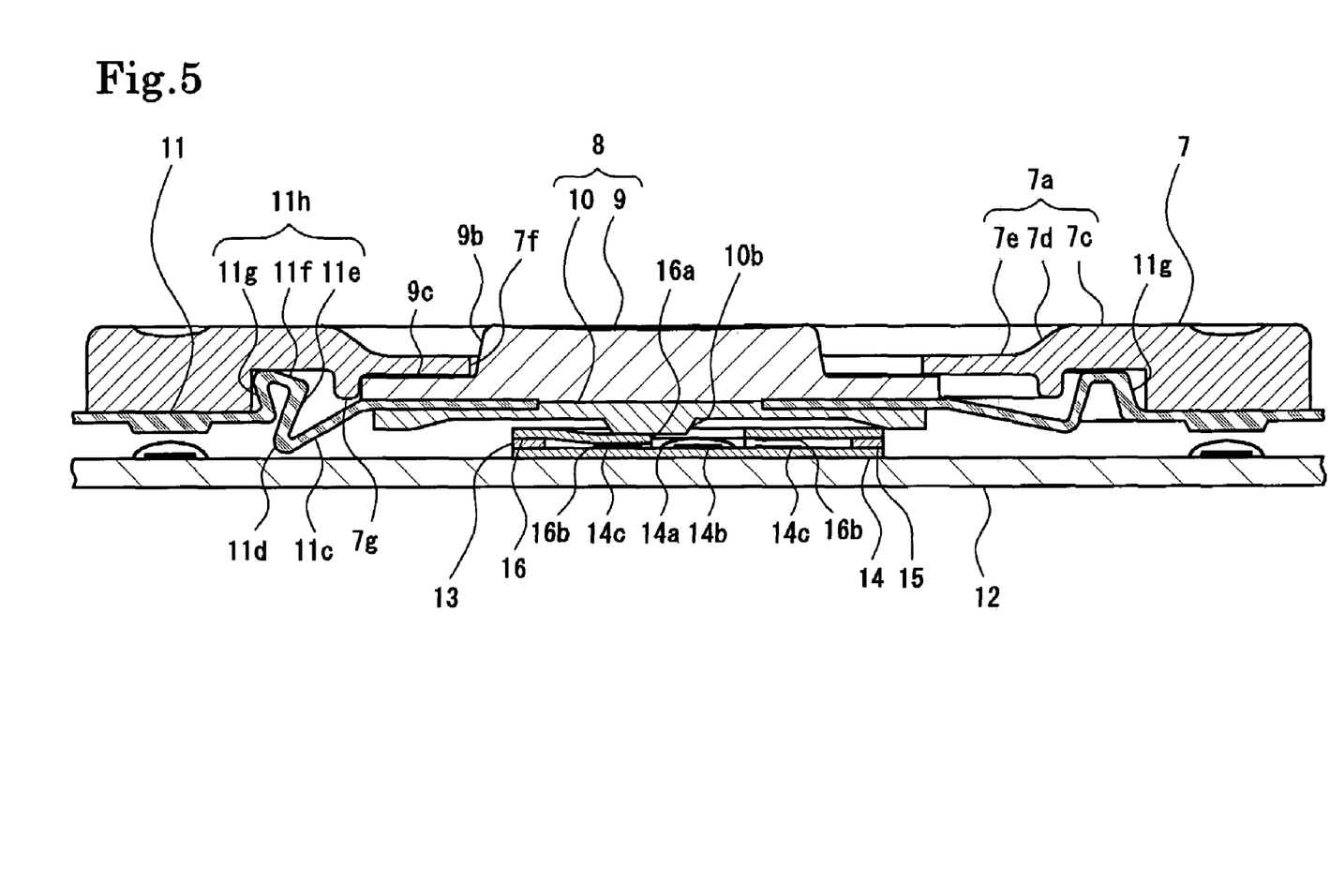
FIG. 5 is an explanatory view illustrating an operation of the slide-type multi-directional input key shown in FIG. 2.

As shown in FIG. 5, in the state in which the input sliding is stopped, the upper surface of the outwardly directed flange 9c of the upper key top 9 and the back surface of the inner peripheral portion 7e of the outer-ring key top 7 remain superimposed one upon the other. Thus, there is no danger of the central key top 8 coming off the insertion hole 7f. Further, it is possible to prevent intrusion of foreign matter through the portion. Even if any foreign matter is allowed to intrude, it cannot enter the interior of the mobile telephone 1 due to the sealing effect of the key sheet 11 firmly attached to the outer-ring key top 7 and the central key top 8.

During the process in which the central key top 8 slides from the initial position shown in FIG. 2 and in the state in which the sliding is stopped as shown in FIG. 5, the bottom surface of the pushing member 10b is situated above the metal belleville spring 14a. Thus, it is possible to effect not only the input through contacting of the upper contact 16b and the lower contact 14c constituting the "contact input portion" but also the input through contacting of the metal belleville spring 14a and the contact 14b constituting the "central contact portion". To effect this input, the central key top 8 is pushed in. Then, the metal belleville spring 14a comes into contact with the contact 14b to effect input with a tactile feel due to buckling.

The key sheet 11 behaves as follows in the input sliding process. The outer peripheral erect wall portion 11g of the curved portion 11h of the key sheet 11 on the sliding-direction side (the left-hand side in FIG. 5) has a large wall thickness. Thus, the thin-walled top wall portion 11f, the inner peripheral wall portion 11e, and the inclined portion 11c move as a whole using as a fulcrum the portion connecting the thick-walled erect wall portion 11g and the thin-walled top wall portion 11f, such that the bent portion 11d slides under the thick-walled erect wall portion 11g. Thus, the key sheet 11, which undergoes elastic deformation at the time of sliding, constituting no obstacle, and is capable of orderly elastic deformation.

(Return Sliding of the Central Key Top 8): To effect return sliding of the central key top 8 to the initial position, the operational force being applied to the central key top 8 is released. Then, on both the sliding-direction side (the left-hand side in FIG. 5) and the side opposite thereto (the right-hand side in FIG. 5), the thick-walled outer peripheral erect wall portion 11g generates an elastic urging force in the return direction, whereby the central key top 8 returns automatically to the initial position.

The above-described slide-type multi-directional input key 6 of this embodiment allows various modifications in details.

Figure 6:
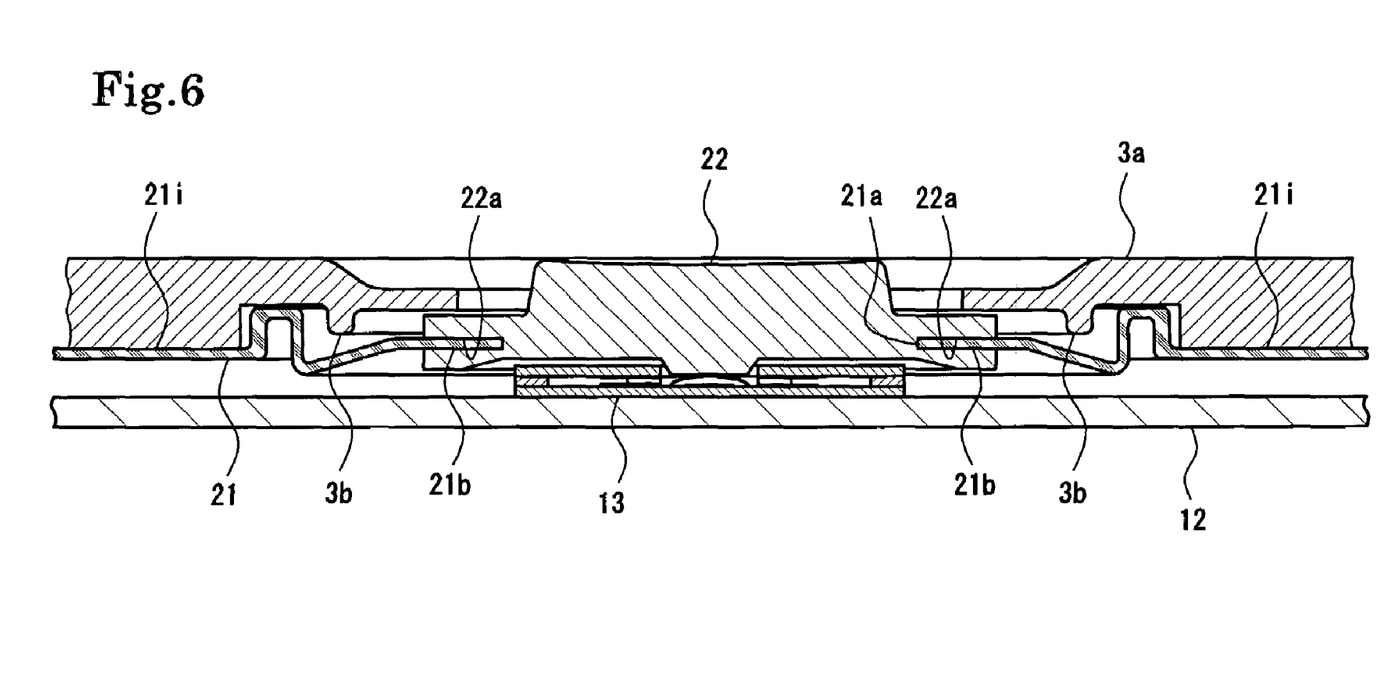
FIG. 6 is a sectional view corresponding to FIG. 2 showing a slide-type multi-directional input key according to another embodiment of the present invention.

While in the above embodiment the outer-ring key top 7 is provided as the "exterior member" to realize plural inputs suitable for the mobile telephone 1, it may also be omitted. As an alternative, FIG. 6 shows a specific example of such a structure. In this example, a casing 3a is used as the "exterior member" instead of the outer-ring key top 7, and a base portion 21i of a key sheet 21 is firmly attached to the back surface of the casing 3a, with a stopper protrusion 3b provided on the back surface of the casing 3a.

While in the above-described embodiment the membrane switch 13 adopts the wiring form as shown in FIG. 3, it is also possible to employ a matrix-like wiring form. Also, the number of "contact input portions" maybe larger or smaller than four according to the change of the wiring form. Further, while the base film 14 of the membrane switch 13 is equipped with the metal belleville spring 14a and the contact 14b constituting the "central contact portion", it is also possible to omit them.

While in the above embodiment the upper key top 9 and the lower key top 10 are formed as separate components, they may be united into an integral unit. In this case, the fixation of the key sheet 11 is effected as follows: For example, in the outer peripheral surface of the central key top formed as an integral unit, there is provided a mounting groove for insertion of the hole-edge peripheral portion 11b of the through-hole 11a of the key sheet 11, and the hole-edge peripheral portion 11b is fitted into the same for fixation. Alternatively, it is also possible to effect the fixation by a chemical means such as adhesive or a mechanical means. FIG. 6 shows a specific example thereof. In the example shown in FIG. 6, the central key top 22 is formed as an integral unit, and the hole-edge peripheral portion 21b around the through-hole 21a of the key sheet 21 is inserted into the mounting groove 22a formed in the outer peripheral surface thereof, effecting fixation due to the rubber resiliency of the key sheet 21 so as not to easily allow detachment.

Further, while in the above-described embodiment the upper key top 9 and the lower key top 10 are formed of a hard resin such as thermoplastic resin or thermosetting resin, it is also possible, for example, to form the upper key top 9 of hard resin, and the lower key top 10 of a resin material like synthetic rubber or thermoplastic elastomer, or to form both the upper key top 9 and the lower key top 10 of such a resin material. In the case in which the lower key top 10 is formed of a resin material as mentioned above, it is desirable to adopt a material of high level of hardness and capable of providing satisfactory slidability. In the case of a resin material incapable of providing satisfactory slidability, it is possible to provide a resin coating or the like to achieve slidability as required.

While in the above-described embodiment the curved portion 11h of the key sheet 11 is in an arch-shaped configuration which is reverse-U-shaped in section, it is also possible to form in other arch-shaped configurations, such as reverse-V-shaped in section or arcuate in section.

While in the above-described embodiment the stopper protrusion 7g is provided on the back surface of the outer-ring key top 7, it is also possible to omit the same; instead, it is possible to cause the outer peripheral surface 9b of the central key top 8 to abut the insertion hole 7f of the outer-ring key top 7 to stop its sliding.

While in the above embodiment no description is made as to the color of the central key top 8 and the outer-ring key top 7 or the display portion displaying the characters, figures, symbols, patterns, etc., it is naturally possible to provide thereon a colored portion or a display portion. Further, in the case of an illumination type apparatus, it is possible to provide an inner light source on the printed circuit board 12.

In accordance with the present invention, there is provided, as the input operation device of an electric apparatus, a slide-type multi-directional input key capable of plural inputs through a novel multi-directional operation instead of the conventional pushing-in input operation. That is, in accordance with the present invention, there is provided a slide-type multi-directional input key comprising: a key top having an upper portion protruding from an insertion hole extending through an exterior member and a lower portion having a pushing member protruding downwardly, that is capable of sliding in the direction of the hole inner surface of the insertion hole, and a plurality of contact input portions adapted to effect input upon receiving pressure from the pushing member when the key top is caused to slide, whereby it is possible to effect input through the contact input portions by a key top sliding operation which requires no great force, thereby mitigating the operator's fatigue even if the sliding operation is repeatedly performed.

In accordance with the present invention, there is provided a slide-type multi-directional input key further comprising a key sheet formed of a rubber-like resilient material and adapted to support the key top so as to allow its sliding from an initial position toward the hole inner surface of the insertion hole and back to the initial position, with the key sheet being firmly attached to the key top and the exterior member, whereby it is possible to effect input sliding and return sliding of the key top by utilizing the rubber resiliency of the key sheet. Further, since the gap between the key top and the exterior member is sealed by the key sheet, it is possible to prevent intrusion of foreign matter such as dust or water.

Further, in accordance with the present invention, there is provided on the back side of the exterior member a protrusion for stopping the sliding of the key top before it comes into contact with the insertion hole, thereby preventing damage to the outward appearance of the key top.

In accordance with the present invention, the key top is compose of an upper key top and a lower key top, with the key sheet secured in a state in which it is sandwiched between the upper key top and the lower key top, whereby it is possible to realize a firm fixation of the components free from detachment even after repeated sliding, thereby further improving the sealing property of the key sheet.

In accordance with the present invention, the key sheet includes an inclined portion spreading out from the portion firmly attached to the key top, and an arch-shaped curved portion formed by upwardly bending the inclined portion starting with its lower end portion, wherein the wall thickness of an erect wall portion in the outer periphery of the curved portion is larger than the wall thickness of an erect wall portion on the inner periphery thereof and that of the inclined portion, whereby it is possible to effect orderly elastic deformation of the key sheet at the time of input sliding of the key top. Further, at the time of return sliding, the thick-walled outer peripheral erect wall portion generates, on both the sliding-direction side and the side opposite thereto, an elastic return urging force in the return direction, whereby it is possible to reliably restore the key top to the initial position.

In accordance with the present invention, when the key top is at a slide position, the bottom surface of the pushing member is situated above the central contact portion, so that it is possible to effect input through both the contact input portions and the central contact portion with the pushing member. Further, in accordance with the present invention, there is provided, as the exterior member, an annular outer-ring key top capable of multi-directional input, thereby further extending the range of operational choices.

What is claimed is:

1. A slide-type multi-directional input key comprising:
   a key top which has an upper portion protruding from an insertion hole extending through an exterior member and a lower portion having a pushing member protruding downwardly therefrom and which is capable of sliding in the direction of a hole inner surface of the insertion hole;
   a plurality of contact input portions adapted to effect input upon receiving pressure from the pushing member when the key top is caused to slide, the plurality of contact input portions being formed by a membrane switch composed of a base film with a plurality of lower contact portions, a flexible film with a plurality of upper contact portions corresponding to the lower contact portions, and a spacer film forming a predetermined gap between the base film and the flexible film; and
   a key sheet formed of a rubber-like resilient material, the key sheet being adapted to support the key top so as to allow the key top to slide from the initial position in the direction of the hole inner surface of the insertion hole and in the return direction toward the initial position, the key sheet generating an elastic urging force whereby the key top returns automatically to the initial position, wherein the one pushing member is in a central portion of the lower portion of the key top, and the pushing member can effect input through the plurality of the contact input portions, wherein the key sheet is firmly attached to the key top and the exterior member.

2. A slide-type multi-directional input key according to claim 1, wherein the key top is composed of upper and lower key top portions, between which the key sheet is sandwiched for firm attachment.

3. A slide-type multi-directional input key according to claim 1, wherein the spacer film has a film removal hole which enables the flexible film to deflect within the range of the pushing member sliding.

4. A slide-type multi-directional input key comprising:
a key top which has an upper portion protruding from an insertion hole extending through an exterior member and a lower portion having a pushing member protruding downwardly therefrom and which is capable of sliding in the direction of a hole inner surface of the insertion hole;
a plurality of contact input portions adapted to effect input upon receiving pressure from the pushing member when the key top is caused to slide; and
a key sheet formed of a rubber-like resilient material, the key sheet being adapted to support the key top so as to allow the key top to slide from the initial position in the direction of the hole inner surface of the insertion hole and in the return direction toward the initial position, the key sheet generating an elastic urging force whereby the key top returns automatically to the initial position, wherein the one pushing member is in a central portion of the lower portion of the key top, and the pushing member can effect input through the plurality of the contact input portions, wherein the key sheet is firmly attached to the key top and the exterior member, the key sheet including an inclined portion spreading out from the portion firmly attached to the key top, and an arch-shaped curved portion formed by upwardly bending the inclined portion starting with its lower end portion, and wherein the wall thickness of an erect wall portion in the outer periphery of the curved portion is larger than the wall thickness of an erect wall portion on the inner periphery thereof and that of the inclined portion.

5. A slide-type multi-directional input key comprising:
a key top which has an upper portion protruding from an insertion hole extending through an exterior member and a lower portion having a pushing member protruding downwardly therefrom and which is capable of sliding in the direction of a hole inner surface of the insertion hole;
a plurality of contact input portions adapted to effect input upon receiving pressure from the pushing member when the key top is caused to slide, the plurality of contact input portions being formed by a membrane switch composed of a base film with a plurality of lower contact portions, a flexible film with a plurality of upper contact portions corresponding to the lower contact portions, and a spacer film forming a predetermined gap between the base film and the flexible film;
a central contact portion below the pushing member of the key top at an initial position thereof; and
a key sheet formed of a rubber-like resilient material, the key sheet being adapted to support the key top so as to allow the key top to slide from the initial position in the direction of the hole inner surface of the insertion hole and in the return direction toward the initial position, the key sheet generating an elastic urging force whereby the key top returns automatically to the initial position, wherein the one pushing member is in a central portion of the lower portion of the key top, and the pushing member can effect input through the plurality of the contact input portions, wherein the key sheet is firmly attached to the key top and the exterior member.

6. A slide-type multi-directional input key according to claim 5, wherein when the key top is at a slide position, the bottom surface of the pushing member is situated above the central contact portion so that the pushing member can effect input through both the contact input portions and the central contact portion.

7. A slide-type multi-directional input key according to claim 5, wherein the exterior member is a ring-shaped outer-ring key top allowing multi-directional input.

8. A slide-type multi-directional input key comprising:
a key top which has an upper portion protruding from an insertion hole extending through an exterior member and a lower portion having a pushing member protruding downwardly therefrom and which is capable of sliding in the direction of a hole inner surface of the insertion hole, the exterior member having on a back surface thereof a stopper protrusion for stopping the sliding of the key top before the key top comes into contact with the insertion hole;
a plurality of contact input portions adapted to effect input upon receiving pressure from the pushing member when the key top is caused to slide, the plurality of contact input portions being formed by a membrane switch composed of a base film with a plurality of lower contact portions, a flexible film with a plurality of upper contact portions corresponding to the lower contact portions, and a spacer film forming a predetermined gap between the base film and the flexible film; and
a key sheet formed of a rubber-like resilient material, the key sheet being adapted to support the key top so as to allow the key top to slide from the initial position in the direction of the hole inner surface of the insertion hole and in the return direction toward the initial position, the key sheet generating an elastic urging force whereby the key top returns automatically to the initial position, wherein the one pushing member is in a central portion of the lower portion of the key top, and the pushing member can effect input through the plurality of the contact input portions, wherein the key sheet is firmly attached to the key top and the exterior member.

9. A slide-type multi-directional input key according to claim 8, wherein the exterior member is a ring-shaped outer-ring key top allowing multi-directional input.

10. A slide-type multi-directional input key comprising:
a key top which has an upper portion protruding from an insertion hole extending through an exterior member and a lower portion having a pushing member protruding downwardly therefrom and which is capable of sliding in the direction of a hole inner surface of the insertion hole, the exterior member being a ring-shaped outer-ring key top allowing multi-directional input;
a plurality of contact input portions adapted to effect input upon receiving pressure from the pushing member when the key top is caused to slide, the plurality of contact input portions being formed by a membrane switch composed of a base film with a plurality of lower contact portions, a flexible film with a plurality of upper contact portions corresponding to the lower contact portions, and a spacer film forming a predetermined gap between the base film and the flexible film; and a key sheet formed of a rubber-like resilient material, the key sheet being adapted to support the key top so as to allow the key top to slide from the initial position in the direction of the hole inner surface of the insertion hole and in the return direction toward the initial position, the key sheet generating an elastic urging force whereby the key top returns automatically to the initial position, wherein the one pushing member is in a central portion of the lower portion of the key top, and the pushing member can effect input through the plurality of the contact input portions, wherein the key sheet is firmly attached to the key top and the exterior member.

* * * * *